United States Patent
Soméus

Patent Number: 5,194,069
Date of Patent: Mar. 16, 1993

[54] METHOD AND APPARATUS FOR REFINEMENT OF ORGANIC MATERIAL

[75] Inventor: George E. Soméus, Guernsey, Channel Islands

[73] Assignee: Productcontrol Limited, Guernsey, Channel Islands

[21] Appl. No.: 576,486

[22] PCT Filed: Apr. 14, 1989

[86] PCT No.: PCT/SE89/00206
§ 371 Date: Oct. 3, 1990
§ 102(e) Date: Oct. 3, 1990

[87] PCT Pub. No.: WO89/09809
PCT Pub. Date: Oct. 19, 1989

[30] Foreign Application Priority Data
Apr. 14, 1988 [SE] Sweden .................... 8801377

[51] Int. Cl.$^5$ .................................... C10B 39/02
[52] U.S. Cl. .......................... 44/500; 201/8; 201/33; 201/35; 201/39; 202/228; 202/136; 202/131; 202/83
[58] Field of Search .............. 44/500; 201/8, 35, 33, 201/39; 202/228, 131, 136, 83

[56] References Cited

U.S. PATENT DOCUMENTS

| | | |
|---|---|---|
| 3,938,965 | 2/1976 | Pyle . |
| 4,058,205 | 11/1977 | Reed, Jr. . |
| 4,115,317 | 9/1978 | Spater . |
| 4,129,420 | 12/1978 | Koppelman . |
| 4,176,010 | 11/1979 | Dudek et al. . |
| 4,218,288 | 8/1980 | Theodore . |
| 4,280,879 | 7/1981 | Taciuk . |
| 4,318,713 | 3/1982 | Lee et al. . |
| 4,366,026 | 12/1982 | Leyendecker . |
| 4,477,257 | 10/1984 | Koppelman et al. .............. 44/632 |
| 4,563,246 | 1/1986 | Reed . |
| 4,591,362 | 5/1986 | Yudovich et al. . |
| 4,908,104 | 3/1990 | Loomans et al. . |
| 4,997,527 | 3/1991 | Kress et al. . |

FOREIGN PATENT DOCUMENTS

| | | |
|---|---|---|
| 2124010 | 10/1977 | Fed. Rep. of Germany . |
| 2315024 | 1/1979 | Fed. Rep. of Germany . |
| 1921884 | 2/1979 | Fed. Rep. of Germany . |
| 75825 | 10/1949 | U.S.S.R. . |
| 1444564 | 8/1976 | United Kingdom . |

OTHER PUBLICATIONS

*Briquetting* by Stillman, p. 4; Chem. Publishing Co. 1923.

Primary Examiner—Olik Chaudhuri
Assistant Examiner—M. Nuzzolillo
Attorney, Agent, or Firm—Ladas & Parry

[57] ABSTRACT

A method and an apparatus for the refinement of organic material is disclosed. Converting and processing organic material is achieved with or without organic and inorganic additions. The base material uses waste material, i.e. forest industry waste and slaughter-house waste. The method and apparatus produce a packeted end product, specifically carbon powder/granulate as full and charcoal for grilling/smoking, as well as active coal and additives for steel production.

9 Claims, 6 Drawing Sheets

METHOD AND APPARATUS FOR REFINEMENT OF ORGANIC MATERIAL

FIELD OF THE INVENTION

The present invention relates to a method and an apparatus for refinement of organic material. More specifically, the present invention relates to converting and processing of organic material, with or without organic and inorganic additions. The base material utilized is waste from other production, e.g. from the forest industry or slaughter-house waste. The invention provides for refinement of the waste material into directly useful or packeted end product where the waste is produced. The invention comprises carbonization of the waste material into carbon powder, and subsequent treatment of the carbon powder into various forms. The invention specifically produces carbon powder/granulate as fuel, charcoal for grilling/smoking, active coal, additives for steel production etc.

State of the Art

Various carbonization and charcoal burning methods have been known for a long time. The problem is to find a method which can be carried out to a lower cost, since the waste material has a very short range of action, i.e., it is not worthwhile to transport the waste material a longer distance than e.g. 50 km. On the other hand, coal from coal mines is contaminated by sulphides and thus requires expensive purification by filters etc.

The present invention provides a dynamic system which can be transported to the origin of the waste material and which at low cost refines the organic material. Thus, organic materials, such as agricultural, forest and slaughterhouse waste, can be used, which materials are not contaminated by undesired substances.

SUMMARY OF THE INVENTION

Accordingly, the present invention provides a method of refinement of organic material characterized by the steps of:

feeding finely divided base material of organic origin into a closed reactor;

decomposing the base material into carbon powder and reaction fluids by carbonization in said reactor;

cooling the carbon powder; and forming the carbon powder to the desired particle size.

Advantageously the cooling step further includes additional treatment of carbon powder, such as mixing with organic and/or inorganic materials in order to produce various end products. The invention is especially intended for producing charcoal for grilling/smoking, active coal and carbon powder/granulate as fuel.

The invention also provides an apparatus for carrying out the method of the invention.

BRIEF DESCRIPTION OF THE DRAWINGS

The present invention will now be described by way of example and with reference to the appended drawings, in which.

DETAILED DESCRIPTION OF A PREFERRED EMBODIMENT OF THE INVENTION

The term refinement, as used herein, refers to conversion and processing of the chemical, biological and physical structure of the organic material (the biomass, carbon compounds), with or without organic or inorganic additions. The intention is to use excess and waste biomaterial and to obtain new end products by multiplicative process effect. Suitable base materials are most organic materials but the most optimal are: air-moist wood, forest fuel or energy wood, chips, peat, oilshale, dried animal debris, straw etc. By supplying heat energy at a low pressure, which promotes the decomposition of the material, the conversion process is effected, with or without additions, whereupon, in dependence of the structure of the biomass, such as energy content, microstructure, elemental analysis, microsystems, main and by-products are formed in different stages. The most important main products are concentrated carbon compounds and condensed distillates in the form of tar, turpentine oil, methanol, acetic acid etc. The by-product is uncondensable gas, which is used to partly fuel the system as process energy. The main products are treated further to end products. Organic material can also be treated in the same apparatus without causing chemical conversion of the structure, with or without additions or heat in the right combination, such as disinfection, product forming, etc.

Figure 1:
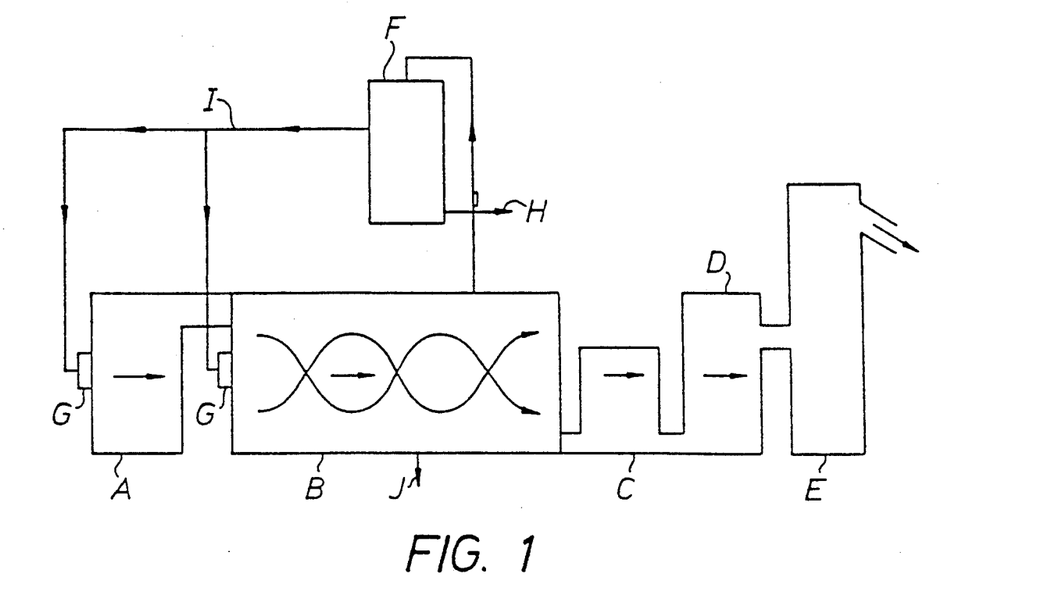
FIG. 1 is a schematic view of an exemplary apparatus according to the invention.

In FIG. 1 a preferred embodiment of the invention is shown in a schematic representation. The apparatus comprises a pre-drying unit A, a process unit or reactor B, a cooling unit C, and granulation unit D, an after-treatment unit E and a distillation unit F. Heating units G are provided before the pre-drying unit A and the process unit B.

In the pre-drying unit A, if necessary, the base material is dried so that it gets a water content of 5 to 10 percent. The base material is also pre-heated to 130°-170° C. If the base material permits, the system can be used without the pre-drying unit A. The base material is thereafter fed into the process unit B in which a high-temperature carbonization process is effected. The process unit is possibly also provided with a graphitization zone. The process yields carbon powder and various fluids. The fluids are directed to the distillation unit F, in which distillation is carried out. The distillation by-products are output at H and the non-condensable gases are output at I and reintroduced into the system at the heating units for energy recovery.

The carbon powder is temporarily stored and cooled in the cooling unit C, where the carbon powder can be treated by addition of organic and/or inorganic materials.

The cooling unit C yields the primary end product, which is fed into the granulation unit D, where it is formed to granulate of a desired particle size. This is the secondary end product.

In the after-treatment unit E the granulate is cooled further, sorted and possibly packeted to yield a finished end product.

The process unit B is also provided with an outlet J for flue gases.

Figure 2:
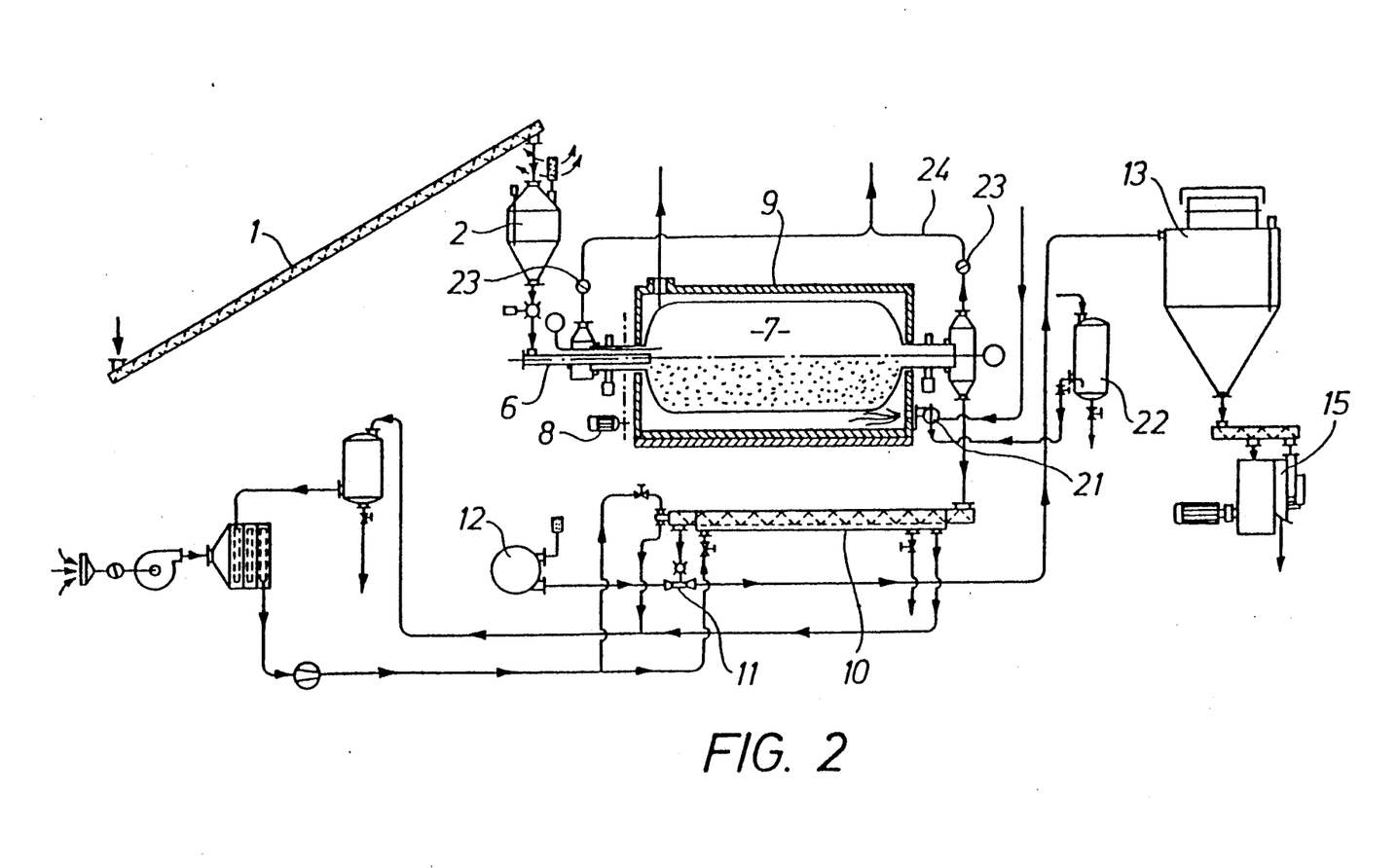
FIG. 2 is a more detailed embodiment of the invention.

In FIG. 2 a specific embodiment of the present invention is shown by way of example. The base material is ground, chopped, sawed or otherwise divided into pieces of an appropriate particle size. It is important that the pieces are not too big, since this disadvantageously effects the heat absorption of the material. The finely divided base material is fed by a feeding unit 1, e.g. a conveyor belt or a screw feeder, into the pre-drying unit 2. In the pre-drying unit the water contained in the base material is evaporated so that the base material obtains a water content of about 5 to 10 percent, the dryer the better.

The material is then fed to the reactor 7 by the reactor feeding unit 6, a screw feeder. The material is degassed by compressing the material in order to avoid oxidation. The reactor 7 is described in further detail below. The reactor is heated to a temperature of 800°-900° C. The temperature is achieved mainly by heat from a burner 21 together with heat set free from exothermic reactions. The burner 21 is fuelled oil and combustible gases recovered from the process. The pressure in the reactor can be varied from about 5/100 atm to 3 atm. A low pressure promotes the decomposition of the material. The base material is decomposed into carbon powder, the primary end product, and various fluids. The carbon powder has a particle size of about 1 $\mu$m. The carbon powder is the product of primary interest but the by-product fluids are utilized as well. Two valves 23 are operated to evacuate the gaseous phase through a conduit 24 to a distillation unit (not shown). The conduit 24 has two connections to the reactor 7, one at each side of the reactor. By closing one of the valves 23 the associated portion of the conduit 24 can be cooled to prevent it from overheating. Combustible gases are transported from the distillation unit to a vessel 22 for temporary storage. From the vessel 22 the gases are fed to a burner 21 that heats the reactor 7 which is arranged in an isolating chamber 9 to be described in further detail below. Thus, the non-condensable gases are reintroduced into the system for energy recovery.

Thereafter the carbon powder is brought to a cooling unit 10 in which the carbon powder is cooled and possibly treated by addition of organic or inorganic material, in dependence of the intended secondary end products. The temperature is decreased from 900° to about 60° C. From the cooling unit 10 the secondary product is transported by a cyclone 11, 12 to a buffer storage 13 in which the product is cooled further, if necessary. Two embodiments of the cooling unit are described in further details below.

Thereafter the secondary product is formed in a forming or granulation unit 15 in which the product is granulated to a desired particle size. The product is now ready for immediate use, bulk transport or packeting in a packeting unit (not shown).

Figure 3:
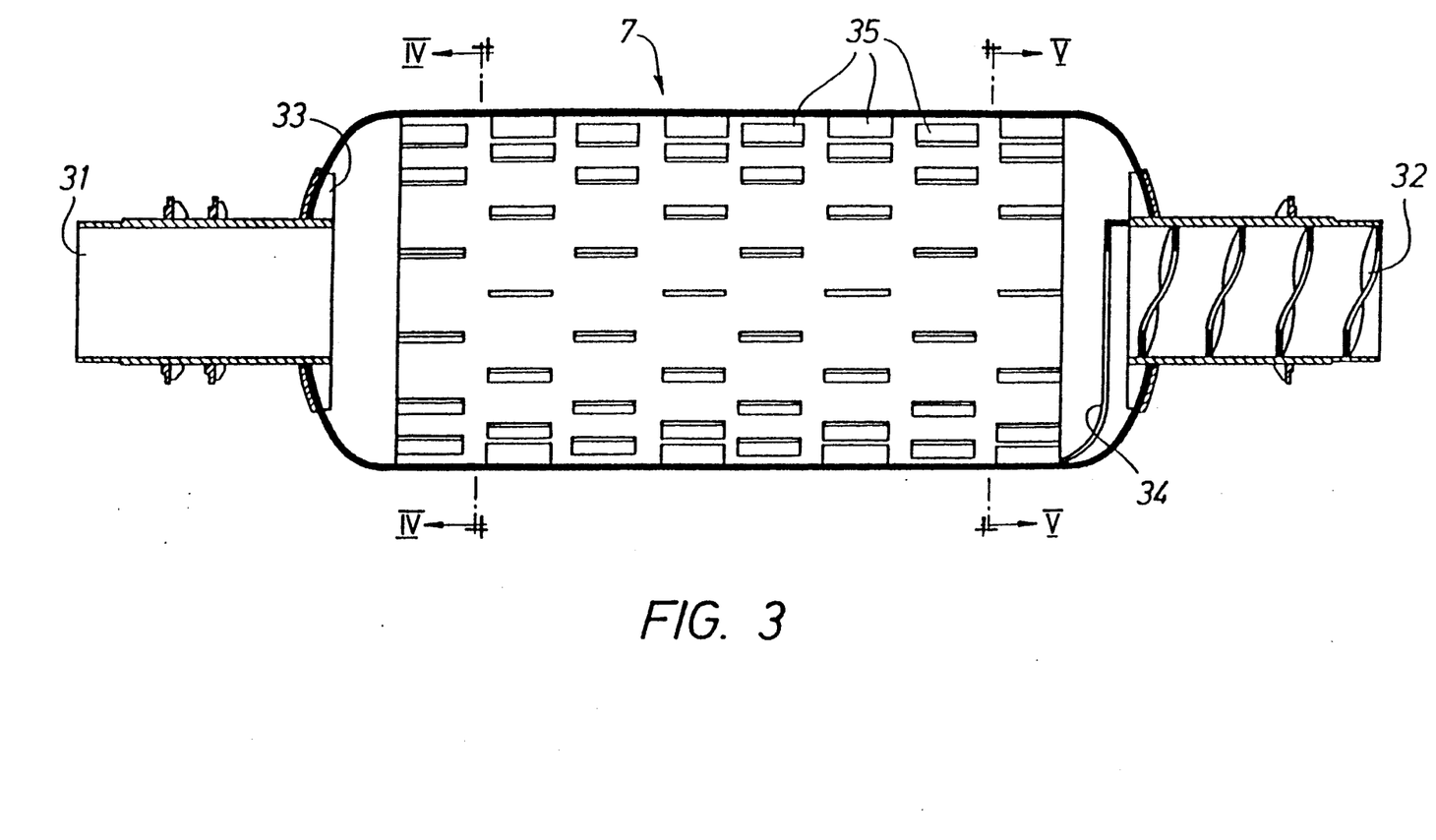
FIGS. 3, 4 and 5 are different views of the reactor of the invention.
Figure 4:
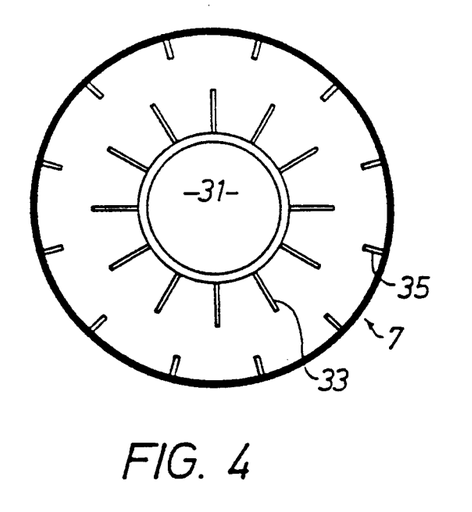
Figure 5:
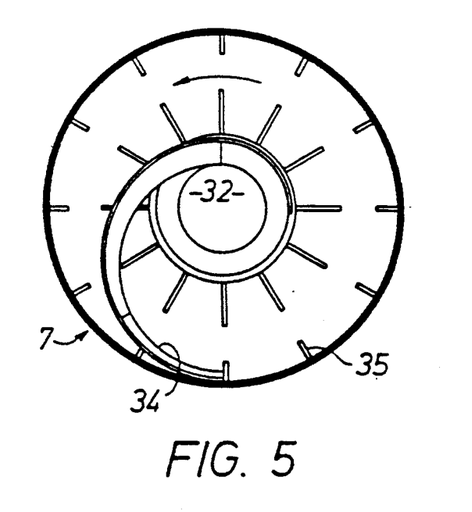

In FIGS. 3 to 5 various views of the reactor 7 are shown. The reactor is made of an acid-resistant material in order to be able to resist the reactive products of the carbonization. The reactor has an inlet 31 through which the base material is continuously fed. The carbonized material is output through an outlet 32. The reactor is rotated by a motor 8 (shown in FIG. 2). The motor speed can be varied in at least three steps in dependence of the base material and the various process parameters. A plurality of fins 33 arranged around the inlet 31 and fins 35 arranged radially on the interior surface of the reactor serve to distribute the material as the reactor is rotating. A coil arrangement collects the carbon powder produced by the process and feeds the material out of the reactor 7 through the outlet 32.

Figure 6:
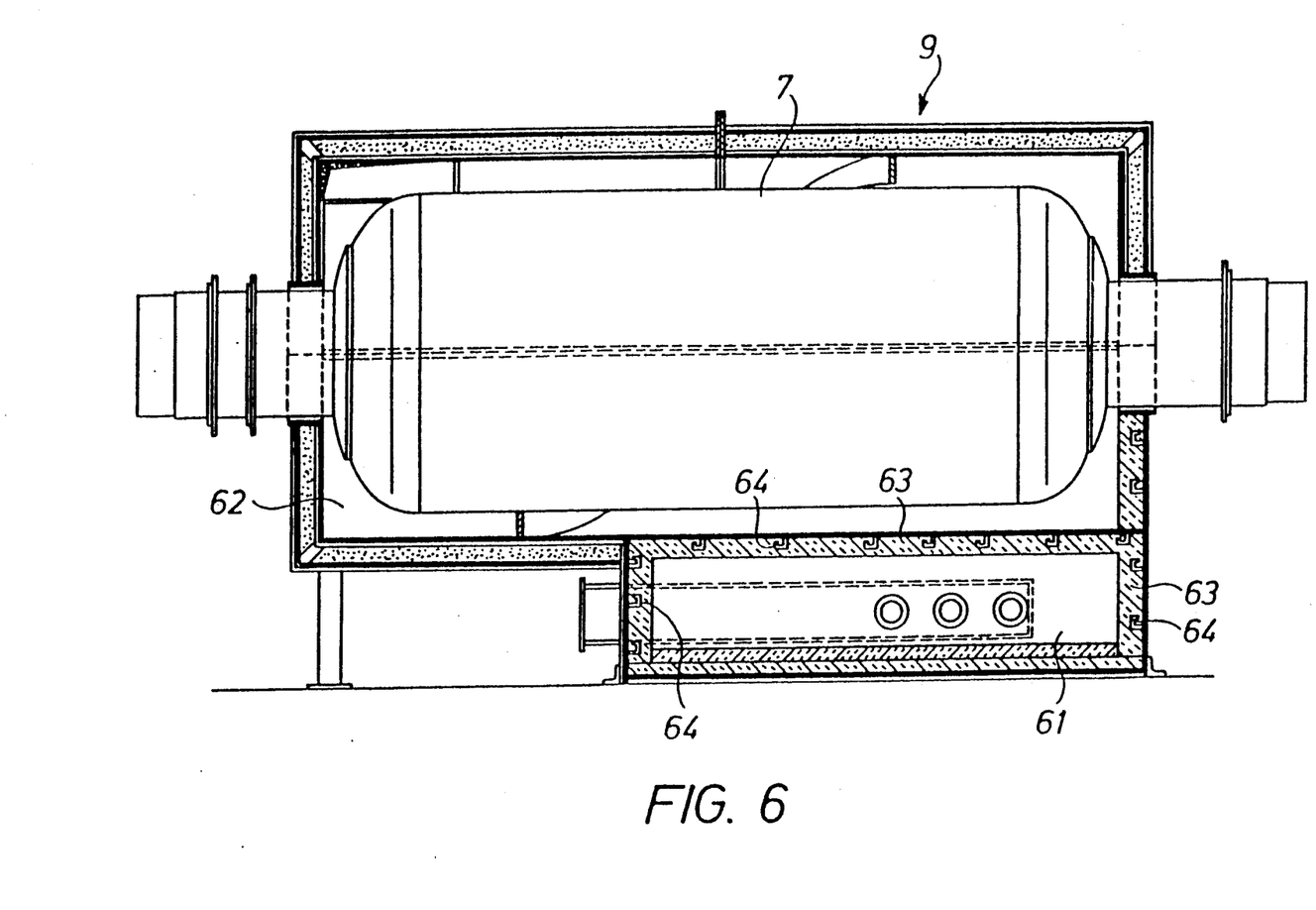
FIG. 6 is a cross-sectional view of a heating chamber.

In FIG. 6 the heating chamber 9 is shown in a cross-sectional view. The chamber actually consists of two chambers, a small combustion chamber 61 and a larger chamber 62 housing the reactor 7. The combustion chamber 61 has walls provided with slabs 63 of ceramic material for heat isolation. The ceramic slabs are quite heavy and they are attached by means of hooks 64 which prevent the slabs from coming loose due to vibrations when the apparatus is transported. The reactor chamber 62 is isolated by walls of fiberglass in order to keep down the weight of the chamber. The top portion of the chamber 62 is hinged as a lid, so that it can be swinged aside for removal or repairing of the reactor 7.

Figure 7A:
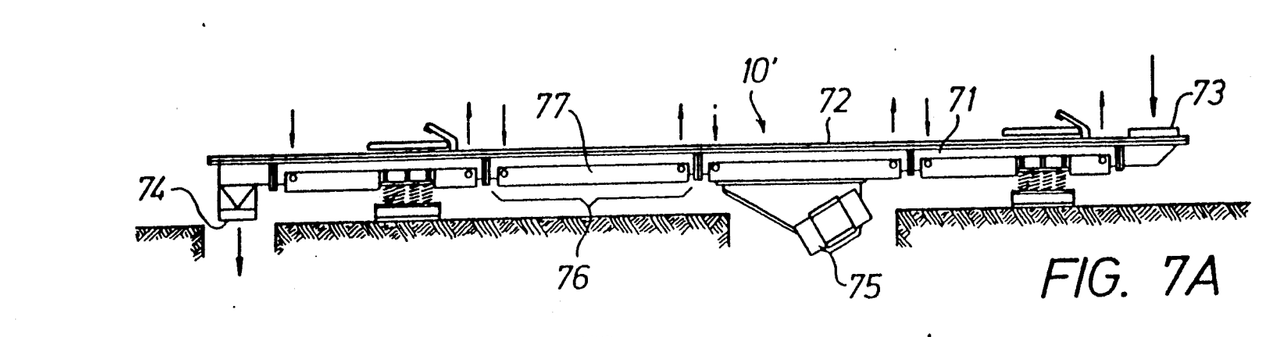
FIGS. 7A and 7B are elevation and plan views, respectively, of a first embodiment of a cooling unit according to the invention.
Figures 7B, 7C:
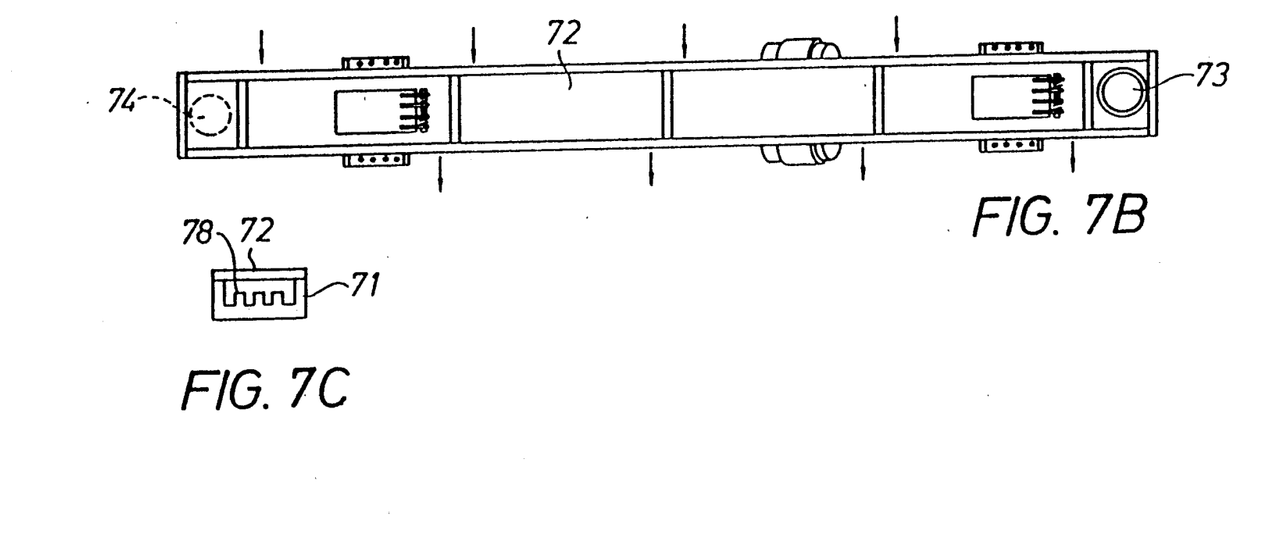
FIG. 7C is a sectional view of the cooling unit of FIGS. 7A and 7B.

In FIGS. 7A, 7B and 7C a first embodiment of the cooling unit 10' according to the invention is shown. As is best seen in FIG. 7C, the cooling unit comprises a trough-like portion 71 having an enclosing top portion or cover 72. The material to be cooled is fed into the inlet 73 and conveyed through the unit to the outlet 74 at the other end. The material is moved by vibrating the whole unit by means of a vibrating motor 75 attached to one of the longitudinal sections 76. Each longitudinal section 76 has a cooling circuit 77 for circulating cooling fluid, e.g. water or oil. The number of sections 76 is chosen in dependence of the required dwelling time of the material. Also the frequency and direction of the strokes of the motor can be varied.

The cooling fluid is circulated in the trough portion 71 and also in upright flanges 78 provided on the bottom of the trough. Thus, the material has a large contact surface with the cooling portions.

The cooling unit 10' is also utilized to add organic and/or inorganic material to the carbon powder and/or to activate the carbon powder. A plurality of nozzles (not shown) is provided through the cover 72. Gases, such as $CO_2$ and $H_2O$, and/or other additives are injected into the carbon powder which stirs up the powder and thus assists to bring the powder in contact with the cooling portions. In addition, the injection itself has a cooling effect and the $CO_2$ also prevents auto-ignition of the carbon powder.

Figure 8A:
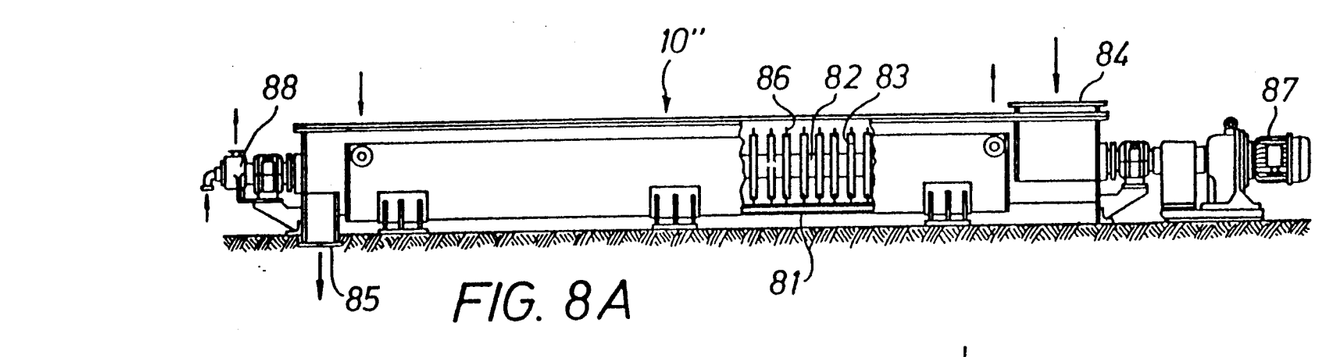
FIGS. 8A and 8B are elevation and plan views, respectively, of a second embodiment of a cooling unit according to the invention.
Figure 8B:
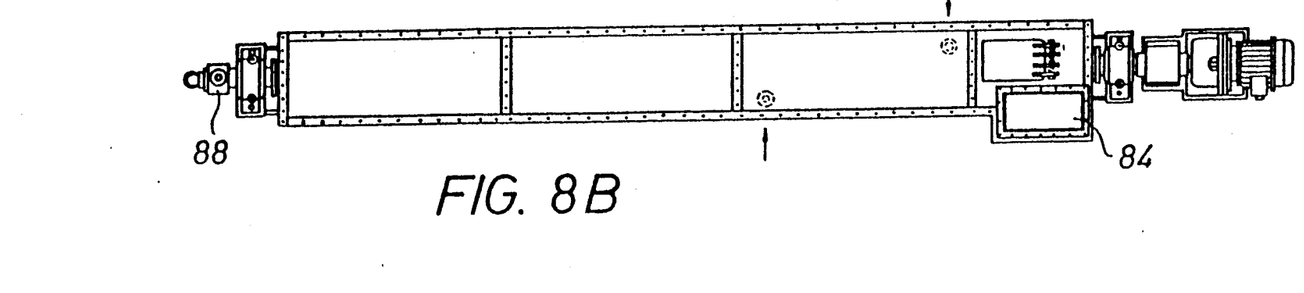

In FIGS. 8A and 8B a second embodiment of the cooling unit 10'' is shown in two views. It comprises a double-walled tube 81 which houses a shaft 82 provided with flanges 83. The carbon powder to be cooled is introduced into the inlet 84 and moved through the unit to the outlet 85 at the other end thereof. At the edge of each flange 83 vanes 86 which are shaped like on a propeller are provided. When the shaft 82 is rotated by a motor 87 the carbon powder is moved successively from one flange 83 to the next through the whole unit.

The cooling fluid, e.g. water or oil, circulates between the double walls of the tube 81 as well as in the shaft 82 and the flanges 83. This arrangement provides a large contact surface between the cooling unit and the carbon powder.

The cooling fluid is introduced into the shaft 82 through a rotary flow control joint 88 provided at one end of the unit. The joint comprises a double-walled tube. The cooling fluid enters the shaft 82 through the inner tube and is directed to the outer tube 81 by a similar joint at the other side of the unit. The cooling fluid finally exits through the outer annulus of the joint 88.

The cooling unit 10" is also provided with nozzles (not shown) for injecting organic and/or inorganic material into the carbon powder. The injection is effected in a similar way to the first embodiment of the cooling unit.

The apparatus according to the invention is suitable for producing various products which are obtained by varying the process parameters, especially the temperature and the pressure in the reactor 7 and by varying the organic and/or inorganic additives. The first product is charcoal for grilling and/or smoking. In this case the carbon powder in the cooling unit is mixed with sawdust from different kinds of wood, spices, water and/or fat. The charcoal so produced generates different kinds of smoke when burning and thus, conveys different seasoning of the grilled or smoked foodstuff. The particle size is about 10 mm diameter.

The second product is active coal in which case carbondioxide, water steam and/or some other activating agent are injected into the carbon powder during the cooling in the cooling unit in order to open the pores of the carbon particles.

The third product is pure carbon powder which is required e.g. in the steel industry and pharmaceutical industry.

A fourth product is graphite. Graphite production requires high temperature and pressure which accordingly require a high strength reactor. This may be prohibitive for the mobility of the system.

The apparatus is advantageously mounted on a vehicle (not shown) so that it readily can be transported to where the base material is produced. Thus, the high transport costs of moving the cheap base material are eliminated. These costs, prior to the present invention, have been prohibitive.

In summary, the present invention has several advantages over the prior art. The biomass is continously fed through the closed, dynamic system, wherein the internal and external parameters of the material and the climate are controlled. The temperature, pressure, dynamic conditions, chemical environment—if necessary by addition of organic or inorganic materials—are correctly set. Starting energy is supplied. At the working temperature/pressure the conversion process is effected, periodically in different stages and rates. Energy is generated which can be reused. Through process control the quantity-quality relation can be set as desired between main and by-products and can be varied by additional substances. The biomass can also be treated without structural conversion. The primary end product—or the base material of the secondary end product—is fed into a buffer storage, agitated at slowly decreasing temperature in a determined period and rate. The end stage of the production is the production of the secondary end product through granulation, compression, extrusion, pulverization, moulding, sorting, or any other type of treatment, at a suitable temperature with or without agents added. The packeting is prepared and the finished material is cooled, dried, dusted, sorted, either in situ or during the bulk transport. The material being finished, the material may optionally be directly packeted in a small unity box system for direct delivery without risk of self-reaction and transport damages.

On the basis of vegetable biomass carbon powder, charcoal and other types of high class fuels with predetermined energy content, carbon filter systems, catalysators, etc. are produced. On the basis of animal biomass, additional material for fodder, manure, etc. are produced. General disinfection of biomass with or without additions can be obtained. That is, the system according to the invention can be utilized with the purpose only to disinfect organic material, e.g. infected waste from hospitals. In this case, the end product is of minor interest just as long as it is not dangerous to handle with respect to the risk of infection. General processing of organic material to convert the structure of the biomass, add, combine, subtract organic or inorganic material can be achieved.

I claim:

1. Method of refinement of organic material including the steps of:
   a) continuously feeding finely divided base material of organic origin into a reactor of a closed dynamic system under low pressure of 0.05 atm;
   b) rotating the reactor and heating it to a temperature of 800°–900° C.;
   c) decomposing the base material into carbon powder and reaction fluids by carbonization in said reactor and separating the gaseous phase in one step;
   d) cooling the carbon powder in a cooling unit comprised in the closed dynamic system with indirect contact only with a cooling medium.

2. Method according to claim 1, wherein the cooling step further includes injecting an activating agent such as $CO_2$ or $H_2O$ into the carbon powder in order to produce active coal.

3. Method according to claim 1, wherein the end product treatment step further includes mixing the carbon powder with sawdust, spices, water and optionally fat, said method producing a particle size appropriate for charcoal for the grilling or smoking of foodstuffs.

4. Apparatus for refinement of organic material, including:
   a feeding means for feeding finely divided organic base material into a closed dynamic processing means;
   the processing means having a rotating reactor under low pressure of 0.05 atm, said reactor being acid resistant and including at least a carbonization zone for producing carbon powder;
   the reactor being provided with fins arranged round an inlet of the reactor and fins arranged radially on the interior surface of the reactor, said fins serving to distribute the material as the reactor is rotating;
   a coil arrangement arranged at an outlet of the reactor for assisting the transportation of material out of the reactor;
   two valves positioned one at each end of the reactor and capable of being opened alternatively for evacuating a gaseous phase including any cumbustible gases;
   a motor having variable speed for rotating the reactor;
   an external heating means for heating the material in the reactor to a temperature of 800°–900° C.,
   said heating means being connected for burning said combustible gases; and
   a cooling means for cooling the carbon powder.

5. Apparatus according to claim 4, characterized by a mixing means for mixing the carbon powder after or during the cooling with sawdust, spices, water and optionally fat in order to produce charcoal for the grilling or smoking of foodstuffs as end product treatment.

6. Apparatus according to claim 4 or 5, characterized in that an injecting means for injecting activating agents such as $CO_2$ or $H_2O$ steam into the carbon powder is provided in connection with the cooling means in order to produce active coal as end step for the carbon production.

7. Apparatus according to claim 4, wherein it is arranged on a mobile vehicle.

8. Apparatus according to claim 4, wherein the cooling means comprises:
a double-walled tube;
a hollow shaft having a plurality of flanges provided with vanes at the respective edges thereof;
an inlet at one end of the tube and an outlet at the other end thereof;
a motor for rotating the shaft, so that the carbon powder is moved through the tube from the inlet to the outlet by the vanes;
a cooling circuit provided through the shaft and the flanges for circulating cooling fluid in one direction of the unit, and back through the interior of the double-walled tube in the opposite direction.

9. Charcoal produced according to anyone of claims 1, 2 or 3 for the grilling or smoking of foodstuffs, wherein in addition to pure carbon, said charcoal also contains sawdust, spices, water and optionally fat.

* * * * *